July 11, 1950        A. E. ROY        2,514,609
SPIRAL SAW BLADE
Filed Aug. 20, 1946
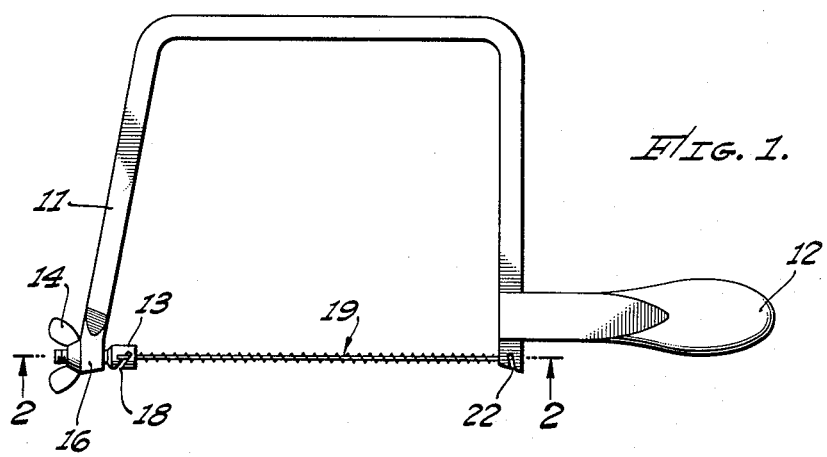
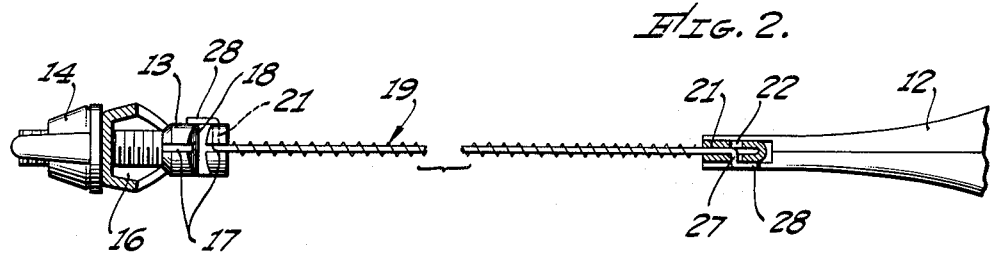
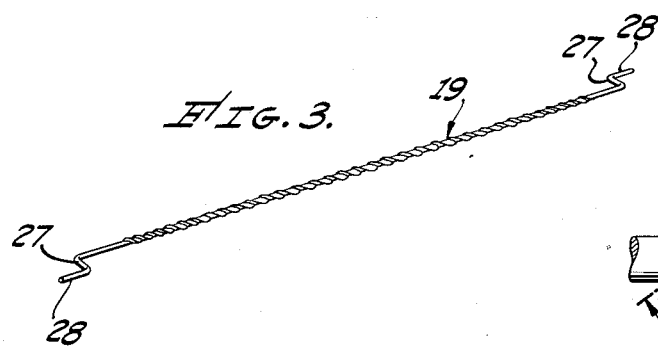
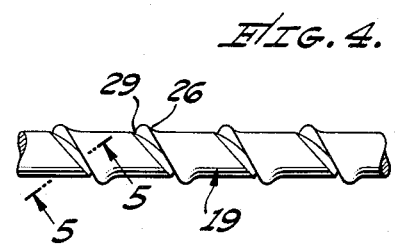
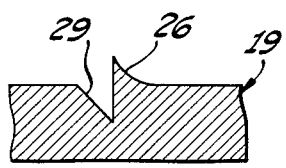
ALBERT E. ROY,
INVENTOR
BY
ATTORNEY.

Patented July 11, 1950

2,514,609

UNITED STATES PATENT OFFICE 2,514,609

SPIRAL SAW BLADE

Albert E. Roy, Burbank, Calif.

Application August 20, 1946, Serial No. 691,764

6 Claims. (Cl. 143—133)

1

The present invention relates to coping saws in general and particularly to an improved coping saw blade. More specifically, the invention comprises a saw blade, the teeth of which extend continuously and spirally about the blade body.

Coping or scroll saws are used to saw material such as wood where the type of cut to be made is characterized principally by its delicate nature rather than by its extent. Where intricate designs are to be made in a solid body, the scroll saw is particularly effective as it is able to cut into the material with a cut of minimum width and to be redirected relatively abruptly to provide successive and connected angularly related cuts.

In the usual scroll saw a blade is removably positioned between the arms of a U-shaped carrier or frame and in substantial alignment with a handle extending outwardly from one arm. Suitable manually adjustable means are provided by which blades may be readily positioned and replaced as desired. The blade itself in coping saws heretofore used has comprised a flat, relatively thin strip of metal formed along one of its longitudinal edges with teeth similar to the teeth found upon the ordinary saw blade. Suitable means are usually provided at the ends of the blade to cooperate with means on the frame to retain the blade in place.

Such saws have performed satisfactorily within their limitations but are characterized by their inability to perform certain desirable operations. The blade, being in the form of a thin strip, is able to advance through a cut in one direction but cannot turn abruptly at right angles to that direction while embedded in the body being sawed. The depth of the blade makes such a turn impossible and to make an angle turn it is necessary to round a corner, so to speak. Such blades are also characterized by their variations in strength in opposing breakage under forces from different directions. They are frequently broken by a transverse or twisting force.

The saw constructed in accordance with the present invention is designed to overcome the defects characteristic of the prior art. Being of circular cross section, its depth is equal to its width and from any position it is free to move in any direction in the body in which it is embedded. The blade is formed of a continuous piece of hardened steel wire on which the cutting teeth extend spirally. The securing means formed integrally on the blade at its ends are adapted to be pressed therein in a simple inexpensive manner and are adapted to cooperate with the holding and securing means of the saw frame.

It is an object of the present invention to provide a new and improved coping saw capable of cutting in any direction when embedded in a solid body.

It is another object of the invention to provide a coping saw blade in which the cutting teeth extend spirally around a hardened cylindrical wire body.

It is a still further object of the invention to provide a coping saw blade in which integral helical teeth are rolled in a hardened wire between the ends thereof which form the securing means.

These and other more specific objects will appear upon reading the following specification and claims and upon considering in connection therewith the attached drawings to which they relate.

Referring now to the drawings in which a preferred embodiment of the invention is illustrated:

Figure 1 comprises a side view of a saw constructed in accordance with the present invention;

Figure 2 is a section looking in the direction of the arrows upon the line 2—2 of Figure 1;

Figure 3 is a view in perspective of the saw blade constructed in accordance with the present invention;

Figure 4 is an enlarged showing of a portion of the saw blade; and

Figure 5 is a partial section in a plane normal to a tooth showing the contour thereof.

In the drawings, in which a preferred embodiment of the present invention is illustrated, the U-shaped saw frame is indicated by the reference character 11 and is seen to be formed with two opposed downwardly extending legs or arms, to one of which a handle 12 is fixedly secured and the other of which seats a headed bolt 13 carrying a manually rotatable thumb nut 14. Frame 11 is, in section, preferably a narrow channel member somewhat expanded where it seats the bolt and nut combination 13 and 14 so as to provide a seat 16 into which the head of bolt 13 may extend should it be necessary in order to seat properly a particularly long blade. The headed end of bolt 13 is provided with a longitudinal slot 17 divided into two parts by a transverse upwardly and inwardly inclined slot 18. Slots 17 and 18 form a retaining seat for one end of the blade 19. The lower end of the opposite arm of the U-frame has its U-channel flattened to form a longitudinal slot 21 which, in the manner of its counterpart slot 17, is intersected by a transverse upwardly and inwardly inclined slot 22. The seats for the blade on the opposite arms of the frame are seen to be functionally identical, differing primarily in that the seat formed by the bolt 13 is longitudinally adjustable upon the rotation of the thumb nut 14.

The saw blade 19, illustrated most clearly in Figures 3 and 4, is seen to be a continuous wire element comprising an elongated central portion provided centrally and for most of its length with a spirally extending raised tooth or ridge 26 which ends a short distance from head portions comprising offset shoulders 27 which, at the opposite ends of the blade, extend in opposite directions so that the extremities of the blade, while parallel, are spaced equal distances upon opposite sides of the central body portion.

The blade is preferably formed of a heat treated hardened wire and in a preferred embodiment has a normal diameter of about .035". The spirally extending teeth 26 are rolled into this wire so that they extend about .007" above the normal surface thereof. The tooth is not formed by cutting out material from the wire but instead is literally rolled from the wire body, a groove 29 being formed at one side thereof which extends below the normal surface of the wire and from which the metal forming the tooth is displaced. The method and means of forming the blade are disclosed and claimed in co-pending application Serial No. 693,888, filed concurrently herewith.

The blade is so formed that the teeth provide a sharp cutting edge, the side surfaces or faces of the tooth making an angle of about 30°, approximately, as shown in Figure 5. Groove 29 is provided with a surface inclined inwardly and downwardly and a surface or face extending vertically at any cross-section through the groove, as shown in Fig. 5. Successive cross-sectional lines forming this face are therefore at right angles with or normal to the longitudinal direction of the wire. Accordingly, such face may be said to be normal to the longitudinal direction of the wire. In a preferred embodiment, the wire of the blade is hard spring steel suitably hardened by oil treatment, the teeth being formed therein after hardening and being spaced about 15 to the inch. The teeth are formed, as stated, by the continuous rolling of one or more parallel ridges helically in the case hardened body throughout the desired length of the centrally longitudinally extending portion.

In the operation of the saw constructed in accordance with the present construction, to position the blade the rotatable nut 14 is loosened upon the bolt 13 to permit the head end thereof to extend inwardly toward the opposite frame leg as far as possible. One end of the saw blade 19 is then seated in the handle end of the frame 11 in the manner clearly illustrated in Figure 2, the offset shoulder being threaded into the transverse slot 22 and the extremity 28 lying along the side of the leg. The opposite end of the blade is then similarly threaded into the angle slots 17 and 18. Thumb nut 14 is tightened and the head end of the bolt 13 moves toward the seat 16 adjacent thereto. Tension is thus placed upon the blade 19 which is drawn taut between the seats at its opposite ends, and is prevented from displacement therefrom by virtue of the outwardly and downwardly slope of the slots 18 and 22 in which the offsets 27 are positioned. With the blade so positioned the saw is ready for operation upon any desired body. Let it be assumed that it is desired to cut a certain design in a piece of wood. The saw is reciprocated to advance the blade into the wood just as in the case of the usual and well known coping or scroll saw. After being advanced into the body if it is then desired to change the direction of the cut at a right angle or at any desired angle relative to the previous direction of cut, this is accomplished simply by exerting force upon the reciprocating blade to move it in that direction. The blade 19 being of equal thickness in all directions and having teeth directed in all directions is adapted as well to move in one direction as in another from any position. This makes it unnecessary to round a corner and in fact the cut may be reversed at an acute angle if desired. The blade being made of heat treated hard spring steel is extremely tough, durable and strong and performs for indefinite periods without replacement.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A saw blade comprising a hardened wire formed with a continuous helical cutting tooth extending above the surface of said wire and of metal displaced therefrom to form a groove below the surface thereof, said tooth having two angularly arranged faces, one of which extends to the bottom of said groove and the other of which extends to the surface of said wire.

2. A saw blade comprising a hardened wire formed with an integral helical cutting tooth extending above the surface of said wire and of metal displaced therefrom to form a groove below the surface thereof, said tooth having two angularly arranged faces, one of said faces extending to the bottom of said groove and normal to the longitudinal direction of said wire at any cross-section through said groove, and the other of said faces extending to the surface of said wire.

3. A saw blade comprising a hardened wire formed with an integral continuous helical cutting ridge extending above the surface of said wire, and of metal displaced therefrom to form a groove below the surface thereof, said ridge having a pair of faces, one of which is normal to the longitudinal direction of said wire at any cross-section through said ridge, and the other of which is sloping.

4. A saw blade comprising a hardened wire of a few hundredths of an inch in diameter having a continuous helical groove therein, one side of said groove extending normal to the longitudinal direction of said wire a few thousandths of an inch beyond the surface of said wire to comprise one face of a saw tooth.

5. A saw blade comprising a hardened wire having a continuous helical groove therein, one side of said groove constituting a face extending angularly with respect to the longitudinal direction of said wire and beyond the normal surface of said wire to constitute one face of an integral saw tooth.

6. A coping saw blade of fine hardened wire comprising a blade having an elongated portion and head portions at the ends thereof, each of said head portions comprising a shoulder portion extending at right angles to said elongated portion and an extremity connected to said shoulder portion and extending parallel to and away from said blade portion.

ALBERT E. ROY.

REFERENCES CITED

The following references are of record in the file of this patent:

UNITED STATES PATENTS

| Number | Name | Date |
|---|---|---|
| 210,421 | Griffin | Dec. 3, 1878 |
| 213,889 | Gage et al. | Apr. 1, 1879 |
| 1,616,880 | Swanstrom | Feb. 8, 1927 |
| 1,665,317 | Maxson | Apr. 10, 1928 |
| 1,993,608 | Kelley | Mar. 5, 1935 |

FOREIGN PATENTS

| Number | Country | Date |
|---|---|---|
| 41,720 | Switzerland | Nov. 27, 1907 |
| 507,876 | France | July 5, 1920 |
| 163,166 | Great Britain | May 19, 1921 |
| 245,301 | Great Britain | Jan. 7, 1926 |